Nov. 8, 1938.  P. M. BLACKMAN ET AL  2,136,037
STRAIGHT LINE CAPPING MACHINE
Filed Feb. 19, 1935   7 Sheets-Sheet 3

INVENTORS.
PHILO M. BLACKMAN
HAROLD R. BALDWIN
BY
Harry H. Hitzeman
ATTORNEY.

Nov. 8, 1938.   P. M. BLACKMAN ET AL   2,136,037
STRAIGHT LINE CAPPING MACHINE
Filed Feb. 19, 1935   7 Sheets-Sheet 4

Patented Nov. 8, 1938

2,136,037

UNITED STATES PATENT OFFICE 2,136,037

STRAIGHT LINE CAPPING MACHINE

Philo M. Blackman, Elgin, and Harold R. Baldwin, Carpentersville, Ill., assignors to Elgin Manufacturing Company, a corporation of Illinois Application February 19, 1935, Serial No. 7,224

22 Claims. (Cl. 226—88)

This invention relates to jar or bottle capping machinery and like devices.

The invention relates more particularly to apparatus of this type for tightening screw caps on jars, bottles, or similar containers that have previously been filled with a liquid, semi-liquid, plastic or viscous material.

An object of the present invention is to provide an apparatus of the type described for tightening screw caps upon containers which have been filled and which are being fed to the capper by means of a conveyor or otherwise in a continuous process.

A further object of the present invention is to provide apparatus of the type described for capping a continuous row of containers moving through the machine in a straight line.

A further object is to provide improved apparatus of the class described which includes an improved straight-line container conveyor means, adjusting means for the conveyor and improved means for actuating said conveyor.

A further object is to provide a capping means for tightening screw caps, capable of performing the capping operation upon a container moving horizontally through the machine.

A further object is to provide a novel and improved movable mounting for operatively supporting and moving said capping means.

A further object is to provide a novel and improved means for moving said mounting during the operation of said capping means.

A further object is to provide improved gripper means for holding a moving container while a cap or cover is being tightened thereon.

A further object is to provide improved gripper means capable of adjustment or movement to hold any desired shape of moving container while a cap or cover is being tightened thereon.

A further object is to provide gripper means as described capable of operation upon a continuous stream of containers moving forward thereto upon horizontal conveyor means, which containers are adapted to pass through said gripper means in a straight line and continue forward in a straight line on said conveyor means.

A further object is to provide an improved and economical drive arrangement for all the elements hereinbefore mentioned, and one which will not easily become broken or out of order.

Other objects and advantages will be more apparent from the following description wherein reference is had to the accompanying seven sheets of drawings upon which—

This machine will be described with particular reference to its employment in connection with capping jars or containers which are being fed into the inlet end 10 of the machine in a continuous stream. It will be understood that as the containers are filled and are fed forward to be capped, screw-threaded caps are placed loosely upon the containers and are fed forward into the capping machine for the purpose of having these caps securely screw-threadedly mounted upon containers.

Certain of the elements thereof are not new and novel per se, such for example as the conveying mechanism which is similar to that shown in the patent to Philo M. Blackman, Number 1,992,464, issued on February 26, 1935, on a Straight line multiple filling machine. A machine such as this is adapted to be used in connection with our present capping device, being connected to the forward end of the present machine so that containers that have been filled can be fed forward to the capping machine in a continuous process.

In the embodiment of the invention shown in the drawings, we provide a base or frame constructed of a pair of upright end frame members 11 and 12. These members are connected together by suitable side frame members 13 and 14 and a motor support member 15.

In the embodiment of the machine, as previously intimated, containers are adapted to be fed through the machine in a continuous straight line, and for this purpose a container driving chain 16 is provided trained about the sprockets 17 and 18 at the opposite ends of the machine. The conveyor chain 16 is provided with a plurality of spaced lugs 19 which, in operation, bear against the rear of a container C and move the same forward upon a plurality of slats 20 supported by spaced cross-members 21. The slats and their supports are mounted upon upwardly turned angles 22 and 23 which extend throughout the length of the machine, and are supported upon the side frame members 11 and 12. The sprocket wheels 17 and 18 are mounted upon cross-shafts 24 and 25 journalled in suitable bearings secured to the lower sides of the angles 22 and 23.

A pair of movable guide members 26 and 27 are positioned adjacent the conveyor chain 16 upon arms 28 carried by side brackets 29 which are fastened to the angle irons 22 and 23. The guide members 26 and 27 define a path of a predetermined width, which path may be narrowed or widened as desired to meet conditions, by adjustment of the arms 28 upon the brackets 29.

As the containers move forward upon the conveyor chain 16, they move directly beneath a continuously rotating disc member 35. The disc member 35 is mounted in a horizontal plane with a lower face 36 which is adapted to engage the tops of covers that have previously been loosely placed upon containers which are passing through the machine. The disc 35 is mounted at the lower end of a vertical spindle 37 which is adapted to be continuously driven through suitable face-gears 38 and 39 from a vertically positioned motor 40. The motor 40 is mounted upon a bracket 41 upon a horizontal portion 42 of a slide bearing 43. By means of adjusting plates 44 and 45, the complete motor and driven spindle assembly may be moved back and forth, or to the right and left, to center the same above any desired point in the path of containers upon the conveyor.

The slide bearing 43 is in turn mounted upon a pair of upright slide members 46 and 47 which are mounted in a yoke member 48. The yoke member 48 is in turn mounted for horizontal reciprocal movement upon a pair of shaft members 49 and 50 secured in suitable bearings 51 and 52. The yoke member 48 carries a pair of inwardly extending arm members 53 in the ends of which roller members 54 are mounted.

It is desired to reciprocate the entire assembly, including the yoke 48, the head slides 47, the slide bearing 43 and the motor driven spindle assembly, continuously in a horizontal plane during the operation of the machine. For this purpose we provide an eccentric 55 which is mounted upon the main driveshaft 56 of the machine. An eccentric head 57 and accompanying strap 58 are attached to the eccentric sheave 59. Both the head and the collar are provided with vertical side walls which engage the pair of rollers 54. From this construction it will be apparent that when the eccentric sheave is being rotated, the movement of the yoke 48 and associated parts will be to and fro in a horizontal plane.

It is also desired to secure an up and down movement for the friction disc 36 and associated parts, and accordingly a vertical spindle 60 is secured to the upper end of the eccentric 55, being connected in a suitable manner to the eccentric head 57. The upper end of spindle 60 is screw-threaded, as shown at 61, and provided with a handwheel 62 mounted thereon. The upper end of spindle 60 is connected to the sliding bearing 43 so that up and down movement of spindle 60 will be transmitted to the sliding bearing 43 and associated parts.

From the foregoing description it will be apparent that by means of the eccentric 55 and its association with the rollers 54 mounted in the yoke 48, a back and forth as well as an up and down continuous movement will be transmitted to the continuously revolving friction disc 36.

In order to hold jars or containers against rotation during the time that the revolving disc 36 is screwing down the caps upon the containers, we have provided means for moving the jars or containers forward under the revolving disc 36, which means also frictionally hold the jar or container against rotation during this movement. This means may comprise the two gripper mechanisms 65 positioned intermediate the end frames 11 and 12 and upon opposite sides of the conveyor chain 16.

As each set of grippers is similar in construction, only one set will be explained herein. In each gripper member we provide a chain 66 formed of alternating links, and gripper plate members 67. Each of the gripper plate members is provided upon its exterior surface with a fabric lining 68. The chain thus constructed is trained upon a pair of sprockets 69, mounted upon stub-shafts 69a, suitably journalled in a supporting bracket 70. The chain, as thus constructed, is loosely trained upon the sprockets mentioned, and during its work engaging movement moves about a chain-shoe 71 mounted and positioned in its path to yieldingly press the chain outwardly to its normal length. The shoe 71 is mounted upon a pair of plungers 72 that are positioned in bearings 73 mounted upon the bracket 70. The plungers 72 are normally yieldingly extended by a pair of spring members 74 which bear against one wall of bearing 73 and a shoulder on the plunger. As thus described, we have provided a chain composed of links and shoes which are adapted to yield and allow jars or containers of a larger size than the space between the adjacent sides 75 of the chain to be moved past the chains compressing the chains against the shoe 71 and the spring members 74. It can be seen, however, that friction is brought to bear against the container by the plates 67, and it is this pressure during the forward movement of the containers that prevents their rotation during a capping operation.

The chains 66 may be driven by means of a pair of bevel gears 76 that mesh with a pair of bevel gears 77 mounted upon a driveshaft 78. The driveshaft 78 is journalled in suitable bearings 79 in brackets 70, and also in hubs 80 in the side frame members 13 and 14. A sprocket wheel 81, keyed to shaft 78, is adapted to be driven by a chain 82 that is trained over a sprocket wheel 83 upon the main driveshaft 56.

Means are provided for varying the distance between the working surfaces of the adjacent sides 75 of the plates 67. This means may comprise a pair of screw-threaded rods 85 and 86 that are provided with a centering member 87 and screw-threadedly mounted in suitable tapped openings in the said walls of brackets 70. The screw-threaded portion 88 is a right-hand thread and the screw-threaded portion 89 is a left-hand thread, so that by rotation of rod 85 by means of handle 90, the brackets 70 and all of the apparatus mounted thereon will be moved outwardly or inwardly according to the direction of rotation. The centering means 87 is adapted to engage in a member 91 having a groove therein and which is mounted beneath the upwardly turned angles 22 and 23 so that the shaft may be rotated by the handle 90 and not change its respective central position with regard to both of the brackets 70. The shaft 86 is similarly mounted and in all respects similar to shaft 85 and is adapted to be driven in the same direction that the rod 85 is rotated by means of a chain 92 trained over a pair of sprocket wheels 93 and 94 keyed to rods 85 and 86 respectively.

From the foregoing description it will be apparent that the gripper chains may be separated or moved closer together in unison by rotation of the handle 90. It is for this reason that bevel gears 77 are mounted as shown, with a key riding in a spline 95 in shaft 78, and that the hub portions of the gears 77 are extended through journals 79 in brackets 70 and secured in position by plate members 96.

To avoid injury to workmen at the machine, suitable shield members 98 are provided for each gripper chain, held in position upon the bracket 70 by means of nut members 99 mounted upon upright bolt members 100.

The drive for the machine will now be explained. We provide a combined motor and reducer 102 mounted upon the bracket 15. The motor is provided with a shaft 103 extending horizontally to the rear of the machine and carrying a sprocket 104. The sprocket 104 carries a chain 105 which is trained about a similar sprocket 106 keyed to the main driveshaft 56. The gripper chains are driven by means of sprockets 83, 81 and chain 82, as previously described. The conveyor chain 16 is adapted to be driven from the driveshaft 56 by means of a chain 108 trained about a sprocket wheel 109 keyed upon shaft 56, which chain extends to a sprocket wheel 110 mounted upon a cross-shaft 111 adjacent the right end of the machine. The shaft 111 has a face gear 112 keyed thereto and in mesh with a similar face gear 113 which is mounted upon shaft 114. The shaft 114 carries the sprocket wheel 18 previously described and about which chain 16 is trained.

Figure 1:
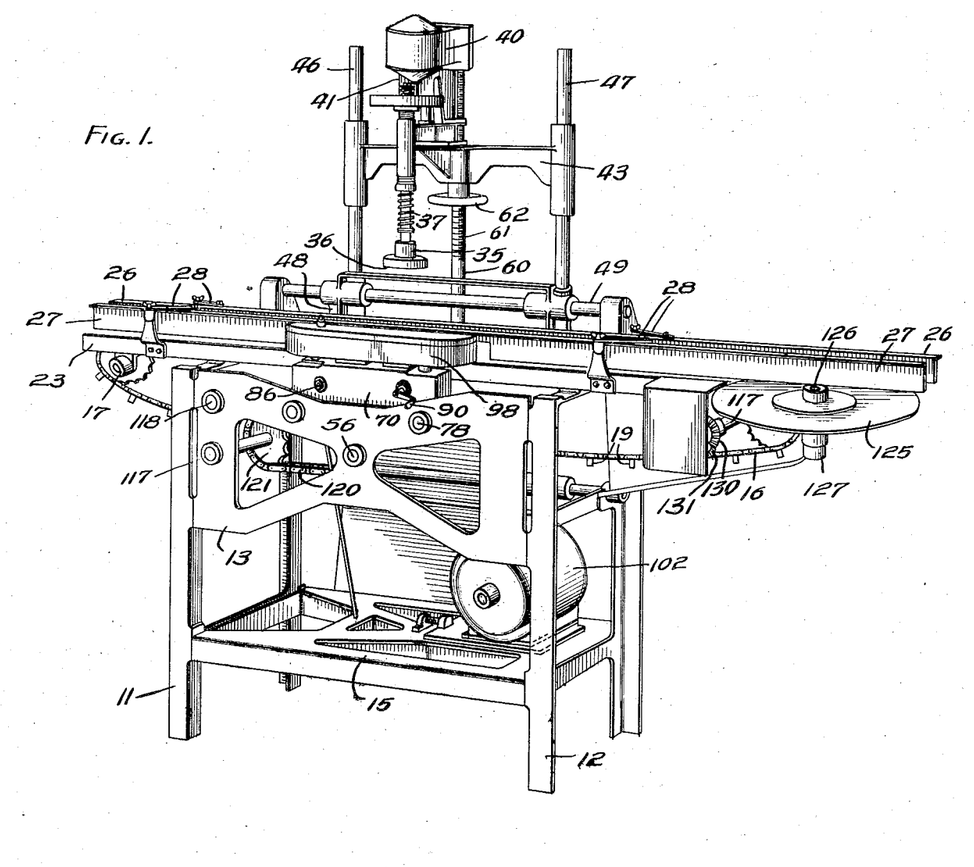
Fig. 1 is a front perspective view of our improved mechanism.
Figure 2:
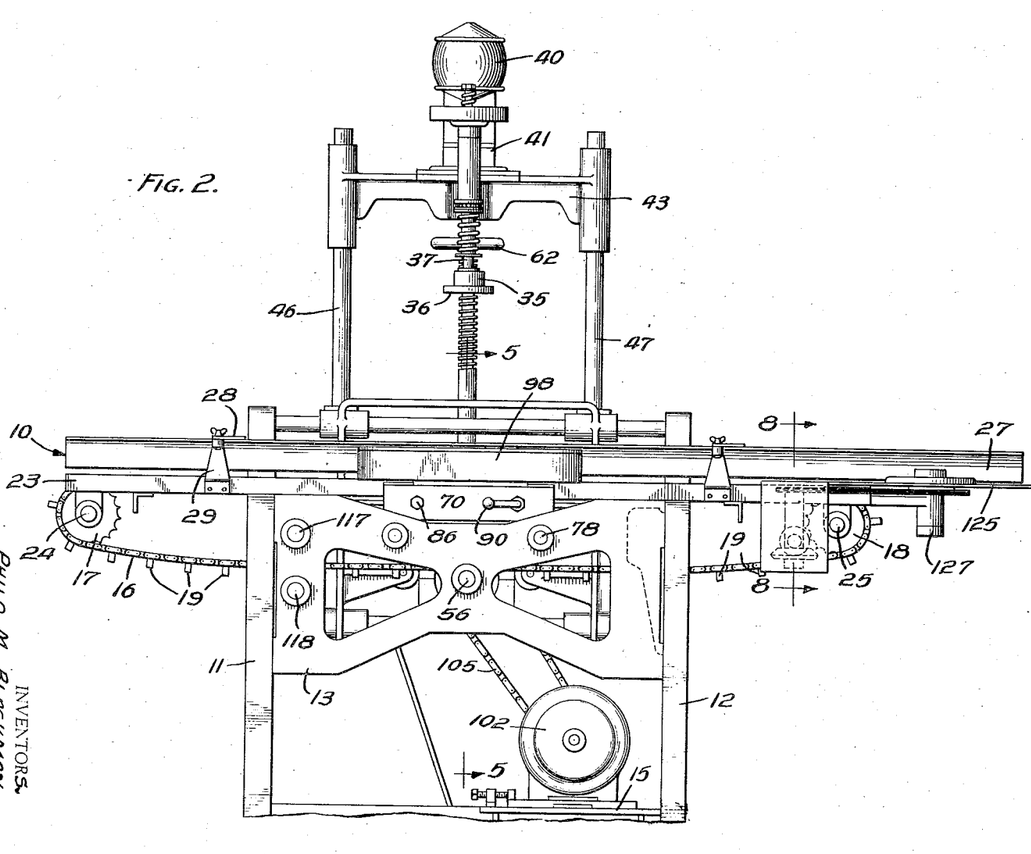
Fig. 2 is a front elevational view thereof.
Figure 3:
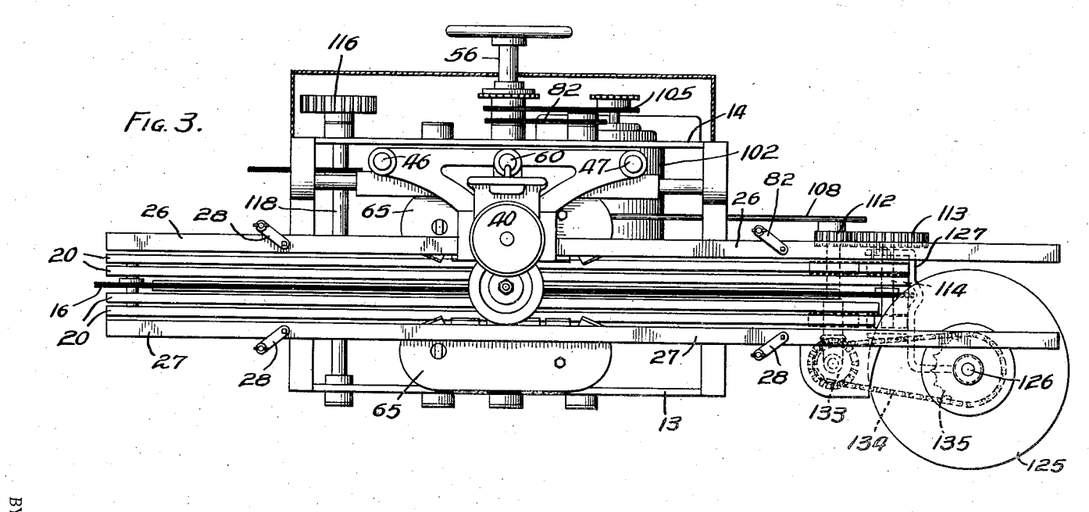
Fig. 3 is a plan view.
Figure 4:
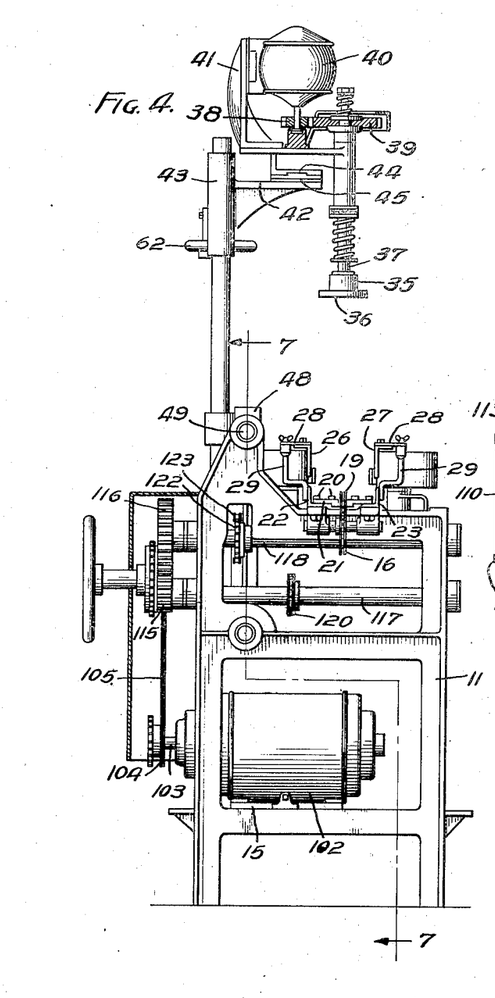
Fig. 4 is a side elevational view looking from the inlet end of the machine with parts broken away in section to more clearly show other parts.
Figure 5:
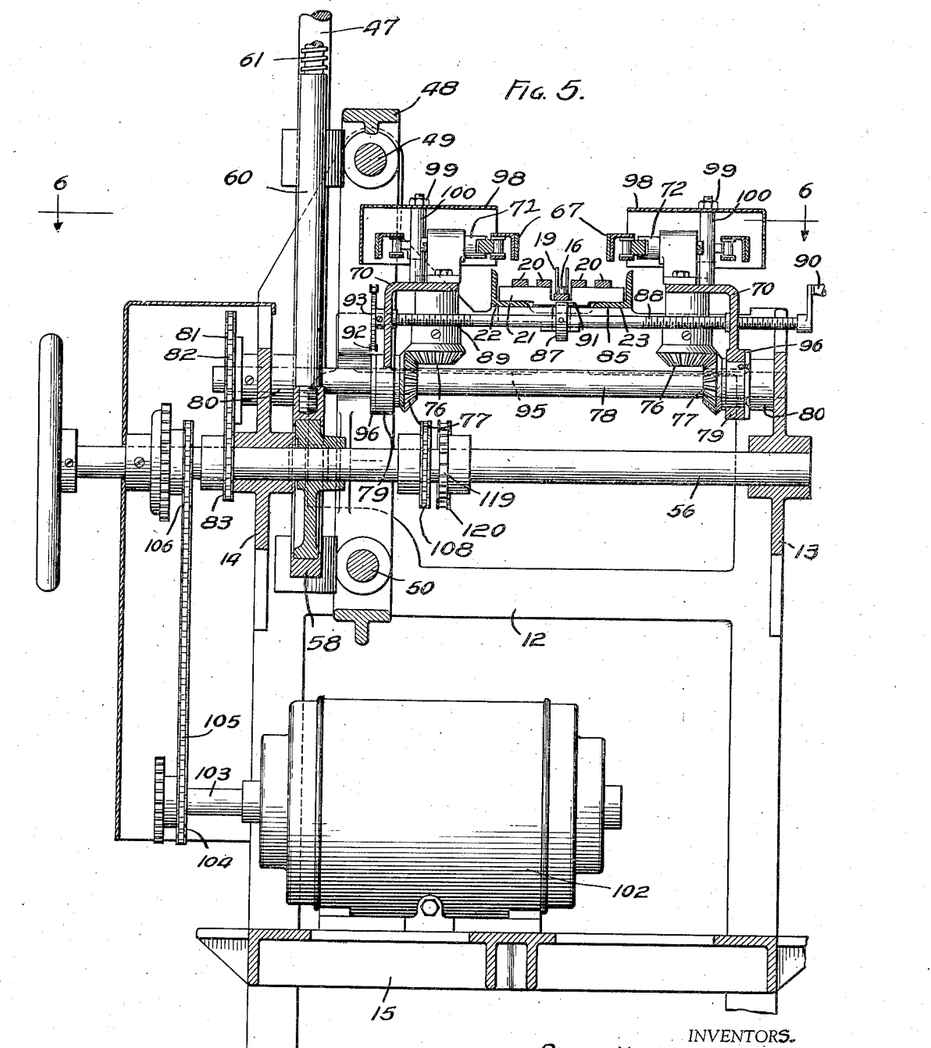
Fig. 5 is a vertical sectional view taken generally on the line 5—5 of Fig. 2.
Figure 6:
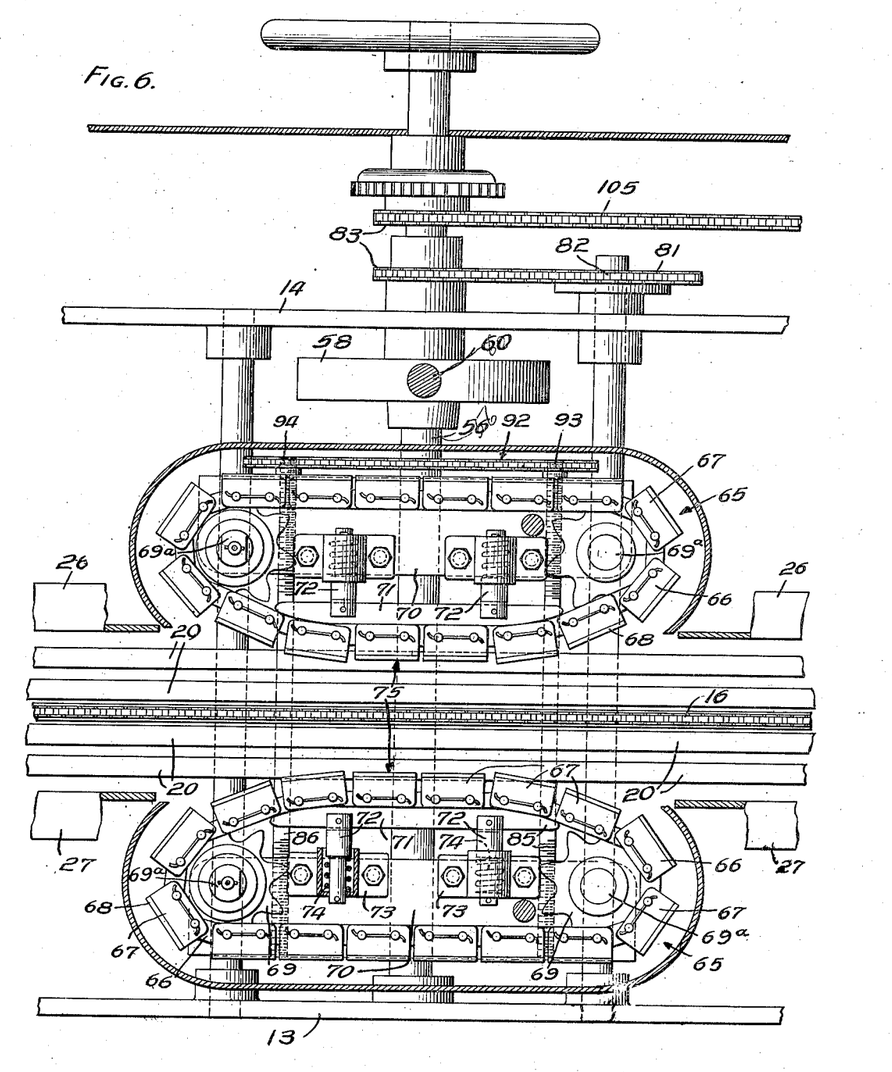
Fig. 6 is a plan sectional view taken generally on the line 6—6 of Fig. 5.
Figure 7:
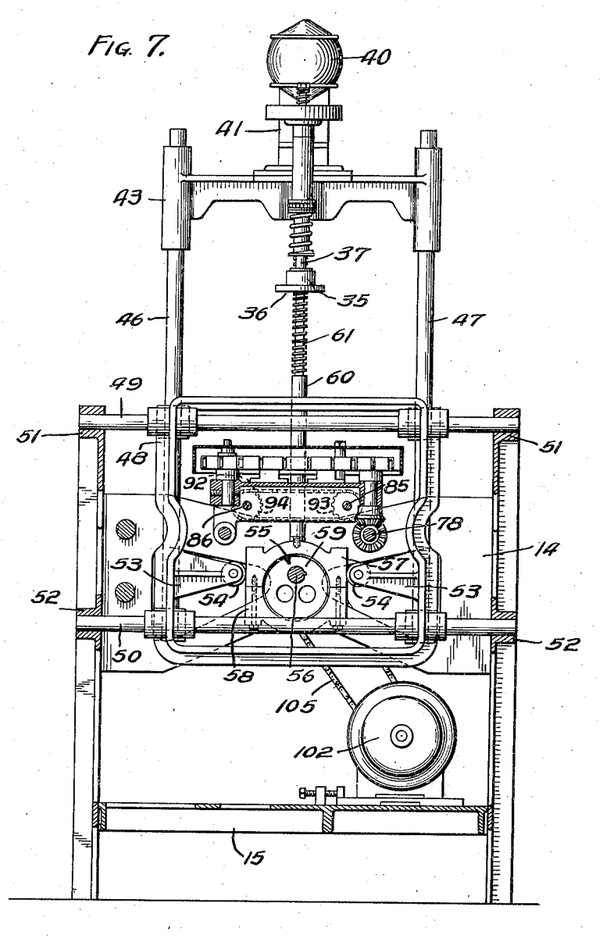
Fig. 7 is a longitudinal sectional view taken generally on the lines 7—7 of Fig. 4.
Figure 8:
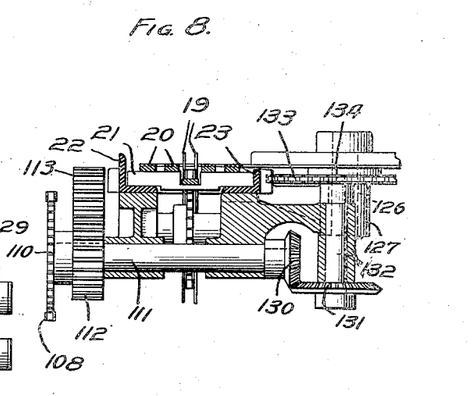
Fig. 8 is a vertical sectional view through the conveyor mechanism taken generally on the line 8—8 of Fig. 2.
Figure 9:
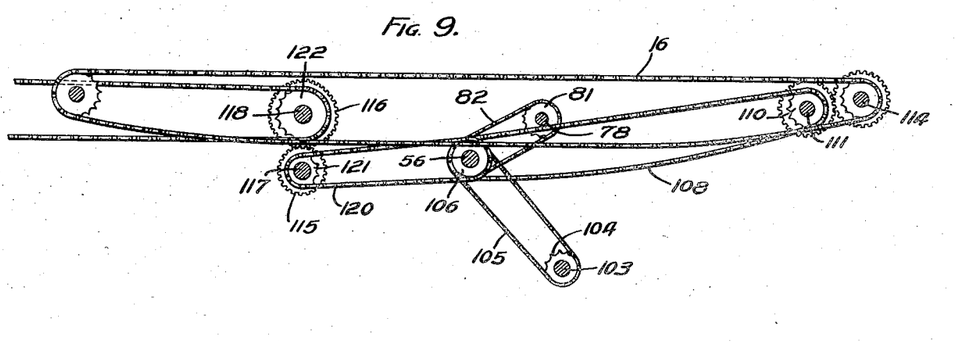
Fig. 9 is a diagrammatic view illustrating the drive of the mechanism.

In the diagrammatic drawing (Fig. 9), we have shown a pair of face gears 115 and 116 mounted upon a pair of shafts 117 and 118, suitably journalled in bearings in side frames 13 and 14. The face gear 115 is adapted to be driven from a sprocket wheel 119 keyed to the driveshaft 56 and upon which a chain 120 is trained. The chain 120 extends to and drives a suitable sprocket wheel 121 that is keyed to shaft 117. The shaft 118 may also carry a sprocket wheel 122 keyed thereto and upon which a drive chain 123 is trained. The drive chain 123 may extend to a suitable sprocket wheel upon a filling machine such as has previously been described and is only used in the event that it is desired to drive the filling machine from the power source of the capping machine.

At the right end of the filling machine we have provided a horizontal turntable 125 suitably keyed to a vertical shaft 126 that is mounted in a bearing 127. The bearing 127 is adapted to be supported from the angle members 21 and 23 of the conveyor frame. In order to remove containers from the conveyor chain 16 at the end of the machine, the horizontal disc 125 is so positioned that it revolves in the path of forwardly moving containers and acts to transfer containers to a similar conveyor upon a labeling or other machine in line.

We provide means for revolving the horizontal disc 125 at a predetermined rate of speed. This means may include a bevel gear 130 secured to one end of the cross-shaft 111. The bevel gear 130 meshes with a similar bevel gear 131 keyed to a vertical shaft 132 which carries adjacent its upper end a sprocket wheel 133 over which chain 134 is trained. The chain 134 is adapted to engage a similar sprocket wheel 135 which is keyed to shaft 126. As thus described, a drive for the turntable 125 is obtained from the driven shaft 111.

A capping operation will now be described. Jars or containers which have previously been filled with a food commodity are conveyed to and pass upon the conveyor 16 at the left end of the machine. As they are moved forward in a continuous stream in a straight line, they come within the vicinity of the friction disc member 36. As has previously been explained, the disc 36, together with its drive and mounting, is continuously moving back and forth, as well as up and down. The action of this disc is so timed that as a container with a loose cap thereon comes into the vicinity of the disc, the disc moves downwardly and frictionally engages the top of the cover and revolves the same to screw-threadedly mount the cap upon the container. While this screw-threading movement is going on, the container is continuously moving forward. The action of eccentric 55 is so timed that during a screw-threading movement the disc 36 will also be moving forward at the exact speed of the container. After the cap has been securely threaded down upon the container, the friction disc 36, due to the action of eccentric 55, will disengage the cap, raise a determined distance, move backward and then come down and engage the next container and cap.

As thus far described, the operation would not be absolutely satisfactory because no means would be provided to prevent containers from turning except the downward frictionally engagement of the disc 36 upon the top of the caps. It is for this purpose, and to insure a secure tightening, that we provide the gripper members previously described. The gripper plates 67 are so arranged that as they move and are forced outwardly by the shoes 71, they will engage the sides of a container whether it be square, hexagonal or round, and will frictionally hold the container during this forward movement against rotation. The gripper chains are arranged to be driven at the same rate of speed that the conveyor 16 is moving, so that as the containers move forward, they are grasped between the pads 68 upon the grippers, and besides being conveyed upon a gravity feed member, they are also positively conveyed forward by holding means which prevent their rotation during forward movement. It will therefore be obvious that a novel and improved mechanism has been designed for securely fastening caps upon containers and for rigidly holding the containers during this operation, all of which is being done during a continuous forward movement in a straight line of the containers themselves.

While we have illustrated and described a preferred embodiment of our invention, it will of course be understood that changes and variations may be made in the particular arrangement of parts or construction. We do not wish to be limited to the specific arrangement shown for securing the reciprocatory movement of the fastening disk, the particular type or construction of disk and drive connection or the particular form of gripper construction or arrangement shown. It will be obvious to those skilled in the art that various changes and modifications may be made in any of these parts without departing particularly from the invention.

What we desire to secure and protect by Letters Patent of the United States is:

1. Apparatus of the class described comprising in combination a horizontal conveyor for containers, spaced lugs on said conveyor for separating said containers, stationary guide means on both sides of said conveyor throughout the length of said conveyor, means for moving said conveyor forward in a straight line at a continuous rate of speed, rotary disc means mounted above said conveyor for turning and tightening screw caps on said containers during their forward movement, said disc means adapted to perform said tightening operation while said disc means is moving forward at the same rate of speed as said containers and means associated with said guide means for holding said containers against rotation during the cap tightening operation, a frame for holding said disc means and motor means for moving said frame forward at the same rate of speed as said containers.

2. Apparatus of the class described comprising in combination a horizontal conveyor for containers, spaced lugs on said conveyor for separating said containers, stationary guide means on both sides of said conveyor, means for moving said conveyor forward in a straight line at a continuous rate of speed, means associated with said conveyor for turning and tightening screw caps on said containers during their forward movement and means for holding said containers against rotary movement during a screw cap turning and tightening operation, said means comprising a pair of spring-pressed belts which hold and carry said containers forward at the same speed the conveyor travels.

3. Apparatus of the class described comprising in combination a horizontal conveyor for containers, spacing means on said conveyor for separating said containers a fixed distance, stationary guide means on both sides of said conveyor, drive means for moving said conveyor forward in a straight line at a continuous rate of speed, means mounted above said conveyor for turning and tightening screw caps on said containers during their forward movement and means comprising a pair of resiliently mounted chain members for holding said containers against rotary movement while moving forward during said operation.

4. Apparatus of the class described comprising in combination a horizontal conveyor for containers, spacing means on said conveyor for separating said containers a fixed distance, stationary guide means on both sides of said conveyor, drive means for moving said conveyor forward in a straight line at a continuous rate of speed, movable rotary means mounted above said conveyor for tightening caps on said containers during their forward movement and means comprising a pair of adjustable resiliently mounted chain members for holding said containers against rotary movement while moving forward during a cap tightening operation.

5. Apparatus of the class described comprising in combination a horizontal conveyor for containers, spacing means on said conveyor for separating said containers a fixed distance, stationary guide means on both sides of said conveyor, drive means for moving said conveyor forward in a straight line at a continuous rate of speed, means comprising a continuously revolving horizontal friction disc mounted above said conveyor for tightening caps on said containers during their forward movement and means comprising a pair of resiliently mounted chain members having friction pads thereon for holding said containers against rotary movement while moving forward during a cap tightening operation.

6. Apparatus of the class described comprising a frame member, a horizontal conveyor mounted thereon, spaced lugs on said conveyor, an adjustable guide means on both sides of said conveyor, a motor mounted on said frame and adapted to drive said conveyor forward in a straight line at a continuous rate of speed, a movable motor support mounted above said conveyor, a motor thereon and cap tightening mechanism adapted to be driven by said motor, said motor support and associated parts arranged for reciprocatory movement to engage a cap, tighten and release the same during the forward movement of a container on said conveyor.

7. Apparatus of the class described comprising a frame member, a horizontal conveyor mounted thereon, spaced lugs on said conveyor, an adjustable guide means on both sides of said conveyor, a motor mounted on said frame and adapted to drive said conveyor forward in a straight line at a continuous rate of speed, a movable motor support mounted above said conveyor, a motor thereon and cap tightening mechanism adapted to be driven by said motor, said mechanism including a horizontally mounted friction disc, said motor support and associated parts arranged for reciprocatory movement to engage a cap, tighten and release the same during the forward movement of a container on said conveyor.

8. Apparatus of the class described comprising a frame member, a horizontal conveyor mounted thereon, spaced lugs on said conveyor, an adjustable guide means on both sides of said conveyor, a motor mounted on said frame and adapted to drive said conveyor forward in a straight line at a continuous rate of speed, a movable motor support mounted above said conveyor, a motor thereon, cap tightening mechanism adapted to be driven by said motor, said motor support and associated parts arranged for reciprocatory movement to engage a cap, tighten and release the same during the forward movement of a container on said conveyor, and an eccentric drive means for causing said reciprocatory movement.

9. Apparatus of the type described comprising in combination a base, a horizontal conveyor for containers to be capped mounted on said base, spaced lugs on said conveyor, guide means on both sides of said conveyor, means for driving said conveyor at a continuous rate of speed to carry the containers forward in a straight line, means associated with said conveyor for capping said containers during their forward movement, said means including a frame reciprocally mounted on said base, an eccentric associated therewith for moving the same back and forth, a second frame slidably mounted on said first frame, a connection to said eccentric for moving said second frame up and down, a continuously driven disc member supported by said second frame over said horizontal conveyor, said continuously driven disc member for frictionally engaging the tops of caps upon said containers, said member capable of engaging the top of a cap, turning the same and disengaging said cap and container during the continuous forward movement of said containers and means for holding said containers against rotation during a capping operation.

10. Apparatus of the type described comprising in combination a base, a horizontal conveyor for containers to be capped mounted on said base, spaced lugs on said conveyor, guide means on both sides of said conveyor, means for driving said conveyor at a continuous rate of speed to carry the containers forward in a straight line, means associated with said conveyor for capping said containers during their forward movement, said means including a frame reciprocally mounted on said base, an eccentric associated therewith for moving the same back and forth, a second frame slidably mounted on said first frame, a connection to said eccentric for moving said second frame up and down, a continuously driven disc member supported by said second frame over said horizontal conveyor, said continuously driven disc member for frictionally engaging the tops of caps upon said containers, said member capable of engaging a cap, turning the same and disengaging said cap and container during the continuous forward movement of said containers, said disc member having a yielding spring mounting and means for holding said containers against rotation during a capping operation.

11. Apparatus of the type described comprising in combination a frame, a horizontal conveyor mounted thereon, said conveyor adapted to carry containers to be capped, spaced lugs on said conveyor, guide means on both sides of said conveyor, means for driving said conveyor at a continuous rate of speed to carry the containers forward in a straight line, a motor, means associated with said conveyor for capping said containers during their forward movement, said means including a continuously driven friction member for engaging the tops of caps upon said containers, a support for said friction member, and eccentric means for reciprocating said support, said eccentric means driven by said motor.

12. Apparatus of the type described comprising a base member, a horizontal conveyor comprising an endless chain trained over a pair of sprockets mounted on said base, spaced lugs on said conveyor, said conveyor adapted to move containers to be capped in a straight line through said machine in a continuous movement and automatic means for tightening caps on said containers, said means including a continuously driven friction disc adapted to be lowered to engage the tops of caps on said containers, move forward therewith, screw-threadedly mount the same upon said containers, rise from said caps and return to its original position to engage further containers and caps and eccentric means for effecting the up and down movement and back and forth movement of said friction disc.

13. A capping machine comprising a base, a horizontal conveyor mounted thereon, guide means associated therewith, said guide means forming a straight line trough for a plurality of containers moving forward on said conveyor, automatic means mounted above said conveyor for tightening caps upon said containers, said means comprising a continuously driven horizontally disposed disc member, a support therefor, means for moving said disc member downwardly to engage the caps on said containers, forward and revolve said caps to a tightened position during the forward movement of said containers and caps, rise from said containers and return to its original position to engage further containers, and means for holding containers against rotation during the cap tightening operation.

14. A straight line capping machine comprising a base, a horizontal conveyor mounted thereon, guide means associated therewith, said guide means forming a trough for a plurality of containers moving forward on said conveyor, automatic means mounted above said conveyor for tightening caps upon said containers, said means comprising a continuously driven horizontally disposed disc member, a support therefor, means for moving said disc member downwardly to engage the caps on said containers, forward and revolve the caps to a tightened position during the forward movement of said containers and caps, rise from said containers and return to its original position to engage further containers, and resilient means for holding containers against rotation during the cap tightening operation, said means including a pair of spaced apart continuously driven chain members.

15. Apparatus of the type described comprising a rectangular base member, a pair of sprocket wheels mounted in opposite ends of said base, a horizontal conveyor chain trained over said sprockets, spaced lugs on said chain, means for driving said chain in a continuous forward movement to convey containers to be capped, adjustable guide means adjacent said conveyor for guiding containers passing therethrough in a straight line, automatic cap tightening means mounted above said conveyor, said means including a vertical continuously driven spindle, a friction member at the lower end thereof, a motor for driving said spindle, a mounting therefor and means for moving said disc down into contact with caps on said containers, forward at the same rate of speed of said containers, up and back in a continuous operation.

16. Apparatus of the type described comprising a rectangular base member, a pair of sprocket wheels mounted in opposite ends of said base, a horizontal conveyor chain trained over said sprockets, spaced lugs on said chain, means for driving said chain in a continuous forward movement to convey containers to be capped, adjustable guide means adjacent said conveyor for guiding containers passing therethrough in a straight line, automatic cap tightening means mounted above said conveyor, said means including a vertical continuously driven spindle, a friction member at the lower end thereof, a motor for driving said spindle, a mounting therefor and means for moving said disc down into contact with caps on said containers, forward at the same rate of speed of said containers, up and back in a continuous operation, said means including a movable support for said cap tightening means and an eccentric for effecting movement thereto.

17. A capping machine comprising a base, an endless horizontal conveyor chain mounted thereon, spaced lugs on said chain, guide means associated therewith, said guide means forming a straight line trough for a plurality of containers moving forward on said conveyor, automatic means mounted above said conveyor for tightening caps upon said containers, said means comprising a continuously driven horizontally disposed disc member, a support therefor, means for moving said disc member to engage the caps on said containers, forward and revolve said caps to a tightened position during the forward movement of said containers and caps, rise from said containers and return to its original position to engage further containers, and means for holding containers against rotation during the cap tightening operation, said disc member capable of adjustment to center the same over any desired spot above the container path.

18. Apparatus of the class described comprising in combination a horizontal conveyor for containers, spaced lugs on said conveyor for separating said containers, stationary guide means on both sides of said conveyor, motor means for moving said conveyor forward in a straight line at a continuous rate of speed, vertically mounted rotary means positioned above said conveyor for turning and tightening screw caps on said containers during their continuous forward movement, a frame supporting said rotary means and an eccentric driven by said motor moving said frame and rotary means forward at the same rate of speed as said containers and moving means adapted to frictionally engage the sides of said containers for holding the same against rotary movement during a screw-cap turning and tightening operation.

19. In a machine of the character described, the combination of means for continuously advancing a container in a straight line, means for screwing a cap on said container during its continuous forward movement and means adapted to frictionally engage opposite sides of said container and movable at the same rate of speed as said container for holding the same against rotation during a capping operation, said means comprising a pair of adjustable loosely mounted vertical chain members and spring mounted shoes holding said chains taut.

20. Apparatus for applying screw caps to containers moving forward at a continuous rate of speed comprising a reciprocally mounted frame, a vertical continuously driven spindle mounted therein, a friction disc at the lower end thereof, a motor for driving said spindle and a resilient vertical mounting for said spindle, and means for moving said frame, said spindle, motor and mounting longitudinally for engaging said caps during the continuous forward movement of said caps and containers.

21. Apparatus of the type described comprising a base member, a horizontal conveyor comprising an endless chain trained over a pair of sprockets mounted on said base member, spaced lugs on said conveyor, said conveyor adapted to move the containers to be capped in a straight line through said machine in a continuous movement, and automatic means for tightening the caps on said containers, said means including a reciprocating bracket, an eccentric engaging the same, a support on said bracket, a motor, a vertical spindle driven thereby, a friction disc secured to the lower end thereof and adapted by the action of said eccentric on said bracket to be lowered to engage the tops of caps on said containers, move forward therewith, screw-threadedly mount the same upon said containers, rise from said caps and return to its original position to engage further containers and caps.

22. Apparatus of the class described comprising in combination a horizontal conveyor for containers, spaced lugs on said conveyor for separating said containers, stationary guide means on both sides of said conveyor throughout the length of the same, means for moving said conveyor forward in a straight line at a continuous rate of speed, a movable rotary disc means mounted above said conveyor for turning and tightening screw caps on said containers during their forward movement, means for moving said disc means forward with the containers at the same rate of speed as said containers, said disc means adapted to perform said tightening operation while the disc means is moving forward at the same rate of speed as said containers and means associated with said guide means for holding said containers against rotation during the cap tightening operation, said container holding means including a pair of vertically positioned chain members driven in opposite directions and placed upon opposite sides of said conveyor and adapted to frictionally engage the sides of a container and move the same forward in conjunction with the conveyor.

PHILO M. BLACKMAN.
HAROLD R. BALDWIN.